7/9/85 XR 4,528,685

United States Patent [19]

Kump et al.

[11] Patent Number: 4,528,685

[45] Date of Patent: Jul. 9, 1985

[54] X-RAY BEAM FILTER DEVICE

[75] Inventors: Howard H. Kump, Elm Grove; William F. Collins, Waukesha, both of Wis.

[73] Assignee: General Electric Company, Schenectady, N.Y.

[21] Appl. No.: 494,974

[22] Filed: May 16, 1983

[51] Int. Cl.[3] .......................... G21K 3/00; G02B 5/22

[52] U.S. Cl. .................................... 378/157; 350/315

[58] Field of Search ............................... 378/156–159, 378/56, 58, 50, 48, 99, 5, 49, 82; 350/315, 316, 318

[56] References Cited

U.S. PATENT DOCUMENTS

| | | | |
|---|---|---|---|
| 3,452,193 | 6/1969 | Peterson | 378/157 |
| 3,965,358 | 6/1976 | Macovski | 378/157 |
| 4,246,488 | 1/1981 | Hura | 378/157 |
| 4,445,226 | 4/1984 | Brody | 378/99 |

FOREIGN PATENT DOCUMENTS

| | | | |
|---|---|---|---|
| 57-22233 | 5/1982 | Japan | 378/156 |

OTHER PUBLICATIONS

"An X-ray Spectral Measurement System for Nanosecond Plasmas", David Johnson, Air Force Weapons Laboratory, 11/73.

*Primary Examiner*—Alfred E. Smith
*Assistant Examiner*—Charles F. Wieland
*Attorney, Agent, or Firm*—Fuller, House & Hohenfeldt

[57] ABSTRACT

A device for linearly oscillating one or more of a plurality of X-ray filter elements singly or in combination in and out of an X-ray beam at television frame rates. First and second substantially coplanar filter elements are adjacent each other and formed as a unitary member that is transverse to the X-ray beam. It is slidable bidirectionally on parallel guide tracks in one plane. A servo motor drives a closed loop belt which attaches to said member. A third planar filter element runs on tracks in a plane parallel to that of the unitary member. There are lug means on the third element spaced apart in the direction of its travel member that project up and are between the lug means on the third element to enable pushing or pulling it. Thus, the first and second filter elements can be oscillated alternately in and out of the X-ray beam by moving said unitary member without engaging the third element so it stays out of the beam. The member can be driven to one travel limit to pull the third element into the beam and let it stay there while the first element is oscillated beneath it so the beam passes through two filters. And the member can be driven to one travel limit and not be oscillated so the third filter element stays in the beam.

10 Claims, 11 Drawing Figures

X-RAY BEAM FILTER DEVICE

BACKGROUND OF THE INVENTION

This invention relates to a device for filtering polyenergetic X-ray beams to obtain emergent beams which have average photon energies lying within a relatively narrow spectral band. The new filter device is especially useful in X-ray apparatus that is adapted for performing digital subtraction angiography.

Digital subtraction angiography (DSA) is now used to image vessels which contain blood that entrains an X-ray contrast medium such as an iodinated compound. According to one DSA method, X-ray beams having low average photon energy and relatively higher average photon energy are projected through a patient alternatingly and in rapid succession over a pre-contrast interval during which the contrast medium has not reached the blood vessel of interest and continuing over the succeeding post-contrast interval during which the medium enters, maximizes opacity and leaves the vessel. In one method, for example, the digital pixel data that represents the image obtained with the first low energy exposure is treated as a mask image and all succeeding pre-contrast and post-contrast low energy images are subtracted from the low energy mask image and the result is stored. Likewise, the first high energy exposure yields mask image data and the data for all succeeding pre-contrast and post-contrast high energy images is subtracted from the high energy mask and the results are stored. This is commonly called temporal subtraction. The stored low and high energy images are then substracted from each other in what is called energy subtraction to yield the data for a difference image frame which should contain pixel data representative only of the blood vessel whose interior is outlined by the boundaries of the contrast medium. The image data are usually weighted before subtraction in such manner that bone and soft tissue will be subtracted out and the contrast medium-filled vessel representative data will remain. The procedure just outlined is commonly called hybrid digital subtraction angiography because there is a temporal subtraction step and an energy subtraction step involved.

Low and high average photon energy X-ray beams are obtained by applying low and high kilovoltages to the anode of an X-ray tube, respectively. As a result, the peak energies of the X-ray photons are substantially different from each other for the low and high kilovoltages but each of the beams will have a distribution of X-ray photon energies. Subtraction of unwanted parts of the images such as soft tissue and bone can be improved if suitable filter elements are put in the X-ray beam which filter out photons having energies below the desired energies of the high and low kilovoltage beams.

The X-ray images are usually acquired with an X-ray image intensifier that converts them to optical images. The optical images are viewed with a television (TV) camera. A preferred operating mode is to make a low energy exposure while the TV camera is blanked and then read out the camera target during the next frame time of 33 ms when the X-ray beam is turned off. This is followed immediately by making an exposure with the high energy X-ray beam while the TV camera is blanked and then reading out the camera target during the next frame time while the X-ray beam is turned off. Thus, it will be seen that for optimum results it is desirable to be capable of inserting one of the X-ray filters into the X-ray beam path before the exposure at one energy is started and to remove the same filter and insert another filter during a TV camera readout frame time of typically 33 ms so the filter will be stationary by the time the exposure at the other X-ray energy is started. Thus, the most rigorous requirements are to be able to insert a filter of one type in the X-ray beam path, stop it, hold it for the duration of an exposure at one energy, remove it and insert another filter during a camera readout frame time and stop the filter and hold it steady during the exposure at the other energy. Some techniques call for making on the order of 50 high and low energy exposure pairs within about a 25-second interval by way of example. In any case, it is desirable to be able to make the high energy and low energy exposures in a pair as close to each other as is possible to minimize the adverse effects of involuntary tissue movement which would result from the exposures being separated from each other by a substantial amount of time.

The most common practice for inserting different filters in an X-ray beam is to mount the filters on a disk or drum that is driven rotationally in one direction and to attempt to make the X-ray exposures in synchronism with arrival of the proper filter in the X-ray beam. These filter devices must have the filter element rotating about a large radius which means that the filter wheel must have a large radius. It will thus have high inertia prohibiting abrupt acceleration, pausing at a stop and then accelerating and pausing again to have another filter element in the beam before starting the next exposure. A proposed solution to this is to use filter elements that are formed as long arcs and to have them mounted on a filter wheel of substantial radius such that the arcuate filter elements will remain in the X-ray beam long enough to permit exposures at different energies for limited durations at least. A filter device of this kind would have to be unacceptably large and difficult to locate close to the X-ray tube focal spot.

SUMMARY OF THE INVENTION

The invention described herein overcomes the above-noted disadvantages and provides additional advantageous features as well. According to the invention, the filter elements for the X-ray exposures at different energies are translated linearly in and out of the X-ray beam rather than being moved rotationally. The filter elements are so designed that they can be positioned very close to the focal spot of the X-ray tube which means that the filter elements can be small but will extend across the X-ray beam where it has only small divergence. The low mass of the filter elements contributes to achieving exchange of filter elements in the X-ray beam within a television frame time with the use of a low power drive system. A further feature of the illustrated embodiment is that it allows use of different types of filter elements in the X-ray beam and provides for inserting filter elements having two different filtering characteristics in the X-ray beam at the same time.

In accordance with the illustrated embodiment, a first planar filter element and a second planar filter element are formed as a substantially coplanar and unitary member for being transferred in and out of the beam in various modes. The unitary member is mounted on a base for being translated in opposite directions. A third planar filter element is mounted for being translated in a plane that is parallel to the movement plane of the unitary member. Means on the unitary member and third filter element cooperate to cause the unitary member to pull the third filter element into the beam path when the member is driven toward one of its limits of travel and to push the third element out of the beam when the unitary member is driven toward and to the other limit of its travel. A reversible servo motor is operatively coupled to the unitary member which has the first and second filter elements arranged adjacent each other. In one operating mode, the unitary member is driven to one of its limiting positions in which case it pulls the third filter element into the X-ray beam path. Typically, the third filter element would be aluminum which is used to filter out the lowest energy part of the X-ray spectrum which would be absorbed by the patient's skin mostly and would contribute little to the X-ray image anyway. This third filter would ordinarily be held in the beam when the apparatus is being used to make single fluorographic exposures rather than subtracted images.

In another mode, the unitary member is driven to the other of its limit positions to push said third element out of the beam path while at the same time disposing the first element in the beam path and the second element on the unitary member adjacent the beam path. In this mode, the third and first filter elements are adjacent the beam path initially and the second element on the unitary member is in the beam path. Thus, the unitary member can be oscillated without moving the third filter element into the beam while permitting the first and second elements on the unitary member to be disposed in the beam alternately.

In still another mode, the unitary member is first shifted to one of its limiting positions to pull the third filter element into the beam path. The unitary member is then translated to an intermediate position in its path of travel wherein the first filter element becomes aligned with the third filter element, initially, that is at the instant before an exposure sequence begins. Then the unitary member can be oscillated so that the first filter element will be slid out from under the third element for an exposure at one energy and returned to alignment with the third element for the next exposure at another X-ray energy.

How the foregoing objectives and advantageous features are achieved will become evident in the more detailed description of a preferred embodiment of the new filter device which will now be set forth in reference to the drawings.

DESCRIPTION OF A PREFERRED EMBODIMENT

Figure 1:
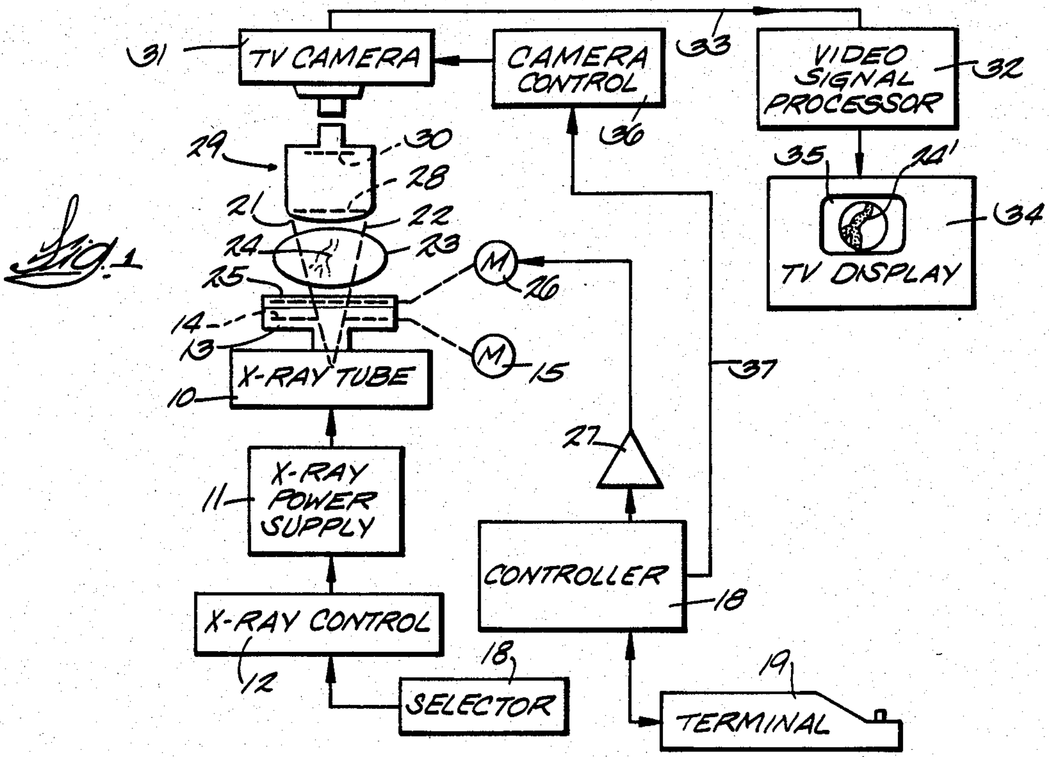
FIG. 1 is a block diagram of a digital subtraction angiography system in which the new filter device may be employed.

FIG. 1 is a block diagram of an X-ray system that can be used for performing various digital subtraction angiography (DSA) and ordinary digital fluorography procedures. The X-ray tube and the casing containing it are represented by the block marked 10. The tube is energized from an X-ray power supply 11. This power supply is to some extent conventional in that it contains the usual high voltage step-up transformer, rectifiers, selectors for the kilovoltage and current that is to be supplied to the X-ray tube during X-ray exposures and the switching elements for turning the X-ray tube on and off. The electronics for controlling the switching cycles is represented by the X-ray control block marked 12. The X-ray power supply and control is one that has the capability of projecting low and high average photon energy X-ray beam pulses alternately and rapidly for the purpose of performing hybrid DSA and also has the capability of projecting longer duration beams for the purpose of performing ordinary digital fluorography or radiography. A suitable multiple voltage, that is, multiple X-ray energy beam producing system is described in Daniels et al U.S. Pat. No. 4,361,901 which is assigned to the assignee of the present invention.

A conventional X-ray beam collimator is represented by the block 13. The collimator is used for the usual purpose of defining the boundaries of the X-ray beam field. One cooperating pair of blades in the collimator are symbolized by the dashed lines 14. Another pair which moves orthogonally to the first pair of blades is not shown. In any event, the blades are driven to positions that cause the proper X-ray beam field to be defined by means of servo motors such as the one marked 15. The servo motors for each pair of blades are usually mounted in the collimator housing. The controls for automatic adjustment of the collimator blade opening to define a beam field that is no larger than the area of the image intensifier or other image receptor that may be used are not shown or described since said controls are conventional.

The operator interface that allows the operator to select the kilovoltages and currents for the X-ray tube for the different energy beams used during an exposure sequence is symbolized by the block marked 18 and labelled "selector."

The dashed line boundaries of the X-ray beam defined by the collimator 13 are marked 21 and 22. This beam is projected from the focal spot of the X-ray tube through the patient who is represented by the ellipse 23. A blood vessel, which may be the subject of a DSA study is marked 24.

In FIG. 1 the block representing the new filter device has the numeral 25. The dashed line within this block is simply to indicate that the X-ray beam will pass through one or more filter elements before penetrating the patient. In accordance with the invention, the filter elements are shifted in or out of the X-ray beam path by using a servo motor 26 which is actually mounted in the filter housing as will be evident later. The servo amplifier and other electronics are represented by the triangle 27. A controller 19 is programmed to provide the control signals to the servo system for acomplishing various filter shifting modes that are pertinent to performing hybrid, that is, temporal and energy subtraction DSA and ordinary DSA. Mode selection is made with terminal 19.

In FIG. 1, the emergent X-ray beam that is differentially attenuated by the body and entrains the X-ray image falls on the photocathode 28 of a conventional electronic image intensifier 29. As is known, the image intensifier converts the X-ray image to a bright and minified optical image which is formed on an output phosphor represented by the dashed line 30. A television (TV) camera views the successive optical images obtained, for example, with the high and low energy X-ray beams and converts the images to analog video signals that are conducted to a video signal processor 32 by way of a cable 33. As indicated earlier, for digital subtraction angiography, one type of filter must be in the X-ray beam for a low energy exposure and another type for a high X-ray energy exposure. In any case, the video signal processor 32 converts the analog video signals to digital signals on a frame-by-frame basis and performs all of the weighting, summation and subtracting steps which will result in producing data representative of the image of the blood vessel 24, for example, to the exclusion of substantially all surrounding soft tissue and bone. The final image data is converted to analog video signals for driving a TV monitor 34 which displays the image 24' of the contrast medium containing blood vessel on its screen 35.

In FIG. 1, the camera control for achieving the proper time relationships for filter element positioning, TV camera target readout and X-ray exposures is marked 36. The control signals for the camera control are provided from system controller 18 by way of a bus 37.

The new filter device will now be described in detail in reference to FIGS. 2–11. Referring to FIG. 8, the bottom 40 of the collimator housing is mountable to the X-ray tube casing. The focal spot of the X-ray tube is indicated by the point 41 from which the X-ray beam 21, 22 diverges. The details of the collimator 13 are not shown except that one pair of blades 14 is illustrated to demonstrate their position relative to the focal spot and the filter device which is generally designed by the numeral 25. The top of the collimator constitutes a base plate 42 for the filter device. It has an aperture 43 through which the X-ray beam is projected toward the patient.

Figure 2:
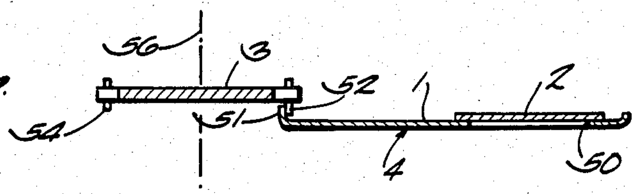
FIG. 2 shows the filter elements of the new filter device arranged for one operating mode.

Refer now to FIG. 2 for a brief description of the filter elements. One of the elements is marked 1 and consists of a metal strip of filtering material which, by way of example and not limitation, may be copper or iron that would be in the X-ray beam which high energy X-ray exposures are being made. For the sake of example, assume copper is used. This copper strip 1, whose configuration can also be seen in the FIG. 11 exploded view, has a hole 50 which is overlaid by another planar filter element 2 which may be in the beam when low X-ray energy exposures are being made. Filter element 2 is comprised of gadolinium in an actual embodiment although other materials might be used depending on the photon energy ranges one might want to attenuate or transmit for a particular X-ray procedure. For instance, elements in the atomic number range of 58 to 71 might be used. In any event, the two different planar filter elements 1 and 2 are arranged adjacent each other and lie substantially in the same plane and they are joined to form a unitary member 4.

Figure 3:
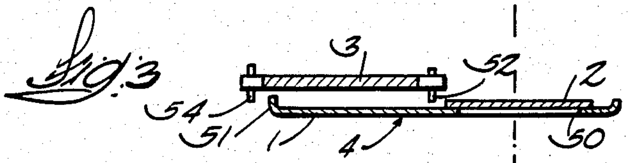
FIGS. 3 and 4 show the filter elements arranged for another operating mode.
Figure 4:
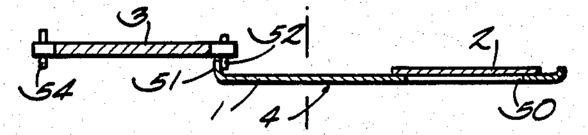
Figure 5:
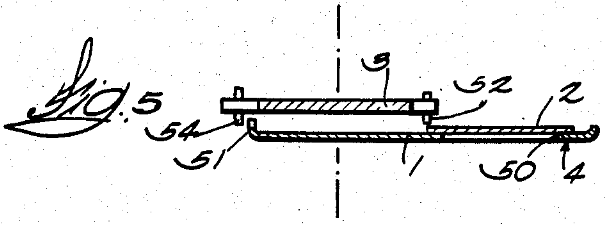
FIG. 5 shows the filter elements arranged for still another operating mode.

Referring further to FIG. 2, one may see that the third filter element 3 is arranged in a plane that parallels the plane of the unitary member 4 comprised of filter elements 1 and 2. Filter element 3 is composed of a filter material that filters out X-ray photons whose energy are so low that they would only be absorbed by the body. Aluminum is used in one actual embodiment for element 3. Note in FIG. 2 that the unitary member 4 comprised of filter elements 1 and 2 has an edge turned up to provide a drive prong or lug 51. The upper filter element 3, on the other hand, has two pairs of downwardly projecting pins. One pair of pins is comprised of pin 52 shown in FIG. 2 and 53 which is visible in FIG. 11 and the other pair of pins is comprised of pin 54, shown in FIG. 2, and pin 55 which is visible in FIG. 11. If, as in FIG. 2, the unitary filter member 4 is translated to its rightmost delimiting position as it presently is, it will be evident that lug 51 would have engaged pins 52 and 53 to pull filter element 3 to the position in which it is depicted in FIG. 2. Thus, the center of element 3 is presently coincident with the central ray 56 of the X-ray beam. It should also be evident in FIG. 5 that if the combined filter member 4 is shifted to the left until lug 51 is just about ready to touch pin 54 that the centers of filters 3 and 1 will coincide with the path of the central ray 56 of the X-ray beam. In FIG. 5 the combined filter member is in an intermediate position between its left and right travel limits. Now it will be evident that if the combined or unitary filter member is shifted further to the left from its FIG. 5 position to its FIG. 3 left limit position, lug 51 will have pushed against pins 54 and 55 so that the filter elements 3 and 1 line up with each other out of the X-ray beam path. In FIG. 3, the center of the low energy filter element 2 is substantially coincident with the central ray 56 of the beam. In FIG. 3, upper filter element 3 is in parked or inactive position. It will be evident now that if the unitary member 4 comprised of filter elements 1 and 2 is shifted to the right from the left limiting position in which it was shown in FIG. 3 to an intermediate position as it is shown in FIG. 4, filter element 2 which is located in the beam in FIG. 3 will be shifted out of the beam as is the case in FIG. 4. In the latter figure, the filter element 1 that is used for making the high energy exposures is then in the beam. In accordance with the invention, the low mass and, hence, low inertia combined filter element can be oscillated at the television frame rate to put one filter element 2 in the beam as in FIG. 3 and then, with a delay of no more than a television frame time put the other filter element 1 in the X-ray beam.

Previously mentioned FIG. 5 shows an operating mode wherein initial conditions are set up by translating the combined filter member 4 to its rightmost limit for lug 51 on the member to abut pins 52 and 53 and thereby pull the top filter element 3 to the intermediate position in which it is shown in FIG. 5 as another step in setting up initial conditions. Now when the combined filter member 4 is shifted to the right until lug 51 almost touches pins 52 and 53 filter element 1 will be removed from the X-ray beam and element 3 will remain in the beam. When the combined member is restored to the position in which it is depicted in FIG. 5, the combination of filter elements 3 and 1 is in the X-ray beam.

To summarize, FIG. 2 depicts one mode of operation that is applicable to fluorographic techniques where a low atomic number filter material 3 that removes uselessly soft x-radiation is fixed in the beam during an exposure of any duration.

The second filter operation mode, applicable to hybrid DSA, is demonstrated in FIGS. 3 and 4 taken together wherein the combined filter member 4 is oscillated rapidly to position filter element 1 in the beam momentarily as in FIG. 3 and filter element 2 in the beam within the same TV frame time in which element 1 is removed as in FIG. 4 while in both cases filter element 3 remains parked out of the beam. This is one of the filtering methods used for hybrid DSA.

The third filtering mode is also used for DSA and it is demonstrated in FIG. 5 where combined filter member 4 is oscillated to put filter elements 3 and 1 in the beam together for a high X-ray energy exposure and to let only filter element 3 remain in the beam during the low energy exposure.

Note that in any of the described modes there will always be at least one of the filter elements 1, 2 or 3 in the X-ray beam to assure that the softest or lowest energy photons which could be absorbed by the body and increase patient dosage without contributing to image formation are filtered out. It should be recognized, however, that in some X-ray equipment, filter 3 might be eliminated and unitary filter member 4 could be used by itself. In such cases the X-ray tube envelope, cooling oil surrounding it and a filter plate, usually aluminum, are relied upon to provide sufficient filtration to remove the soft or low energy X-ray photons.

Figure 7:
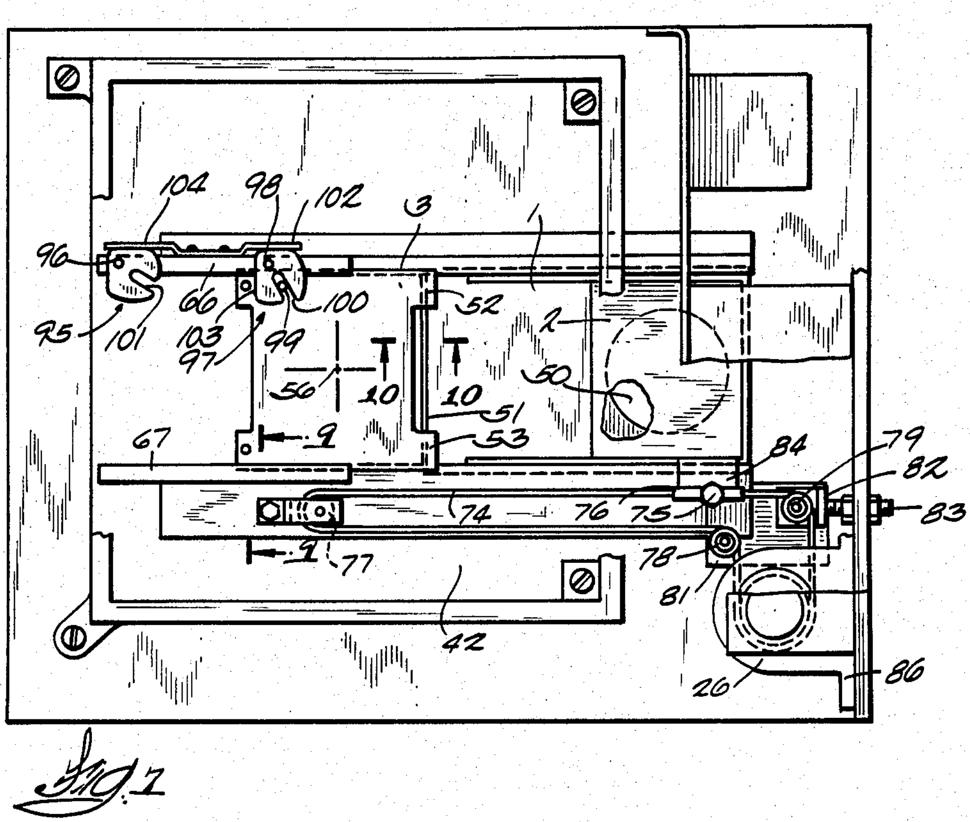
FIG. 7 is a plan view of the filter device.
Figure 8:
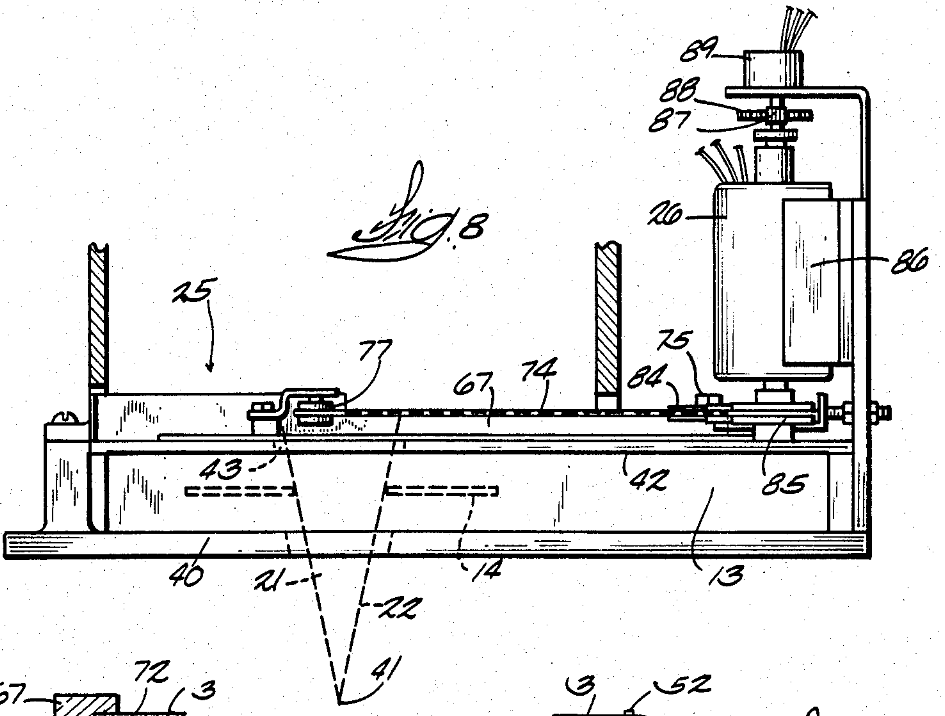
FIG. 8 is a front elevational view, with parts broken away, of the device shown in FIG. 7.
Figure 11:
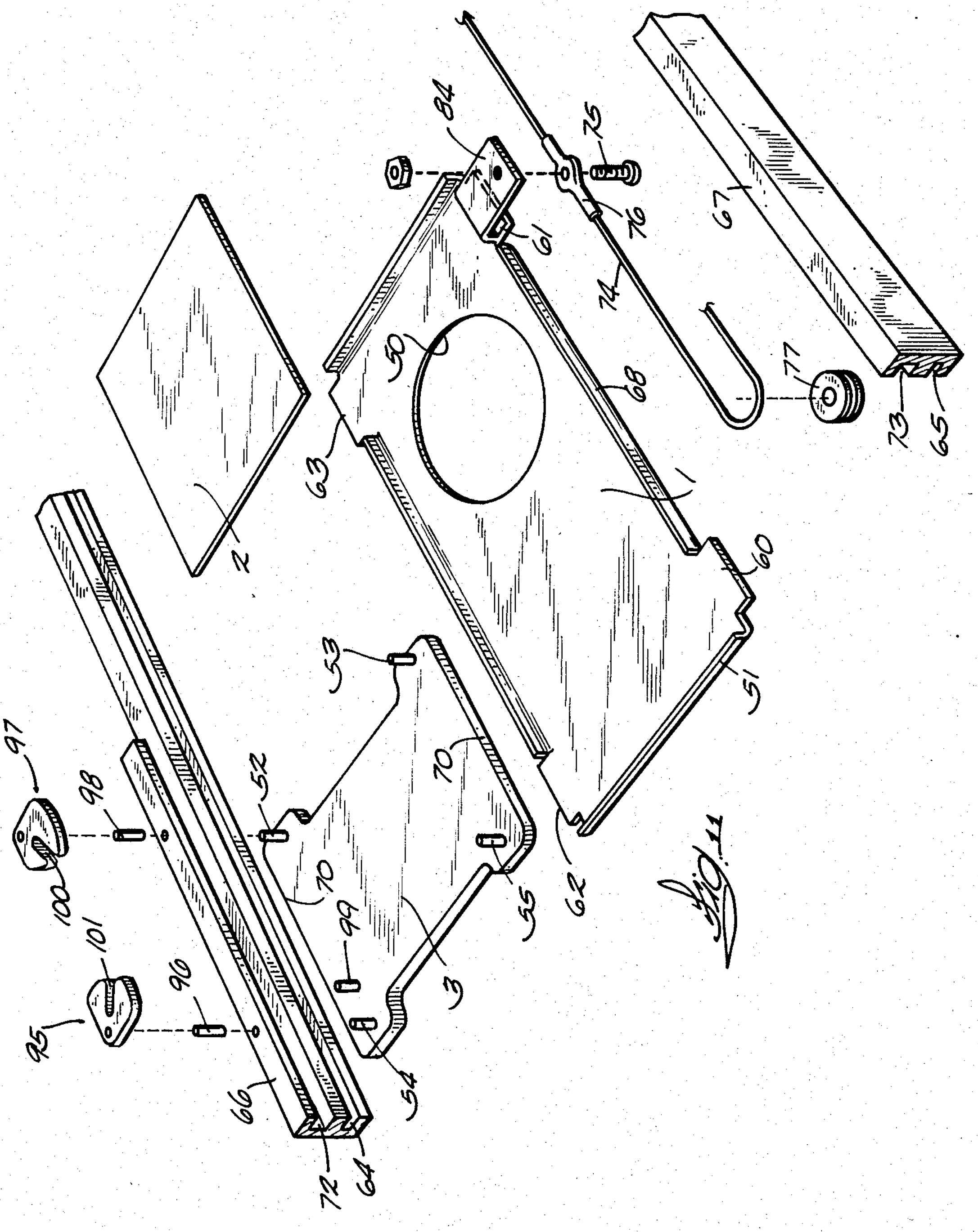
FIG. 11 is an exploded view showing how the filter elements relate to their guide tracks and drive cable.

Referring to FIGS. 11 and 7, one may see that the metal substrate sheet that composes filter element 1 of the unitary filter assembly 4 has laterally extending tongues 60, 61 and 62, 63. These tongues fit into the lowermost grooves 64 and 65 in a pair of track members 66 and 67 which serve as guides for controlling the unitary filter element to translate linearly and laterally or transversely of the X-ray beam. The generally planar unitary filter member also has upwardly bent side edges such as the one marked 68 for sliding against the track or guide members 66 and 67 to thereby prevent the unitary filter member from going askew and possibly binding.

Still referring to FIG. 11, the upper filter element 3 is planar and its edges 70 ride in the upper grooves 72 and 73 of stationary track or guide members 66 and 67, respectively, in parallelism with the unitary filter member 4.

The filter driving mechanism will now be described. Referring to FIGS. 11 and 1, the substrate comprised of the material for element 1 of unitary filter member has a tab or flange 84 extending from it. An endless or closed loop cable 74 is attached to flange 84 by means of a bolt 75 that passes through an eyelet 76 which is also used to join the ends to the cable together. The cable passes around stationary idler pulleys 77, 78 and 79. Idler pulley 77 is mounted for rotation on a fixed bracket 80 and idler pulley 78 is mounted on a fixed bracket 81. Idler pulley 79, on the other hand, is mounted to a movable bracket 82 that is engaged by a lead screw 83 which is rotatable to advance or retract slide bracket 82 and thereby increase or decrease cable tension as required.

Cable 74, as best seen in FIGS. 7 and 8, makes several wraps around a pulley 85 which is on the shaft of a servo motor which is marked 26 in FIGS. 7 and 8 as it was in FIG. 1. The servo motor is fixedly mounted on a bracket 86 extending up from the base 40. As shown in FIG. 8, the upper end of the servo motor shaft has a pinion 87 fixed to it and this pinion is meshed with a gear 88 that is on the shaft of a potentiometer 89. The wiper of the potentiometer, not shown, rotates with the servo motor shaft and provides a varying signal that is indicative of the rotational position of the motor and, hence, the position of the filter elements. These signals are interpreted by the system controller 18 so it can put out the proper control signals for achieving one of the three modes of filter operation described earlier.

Figure 9:
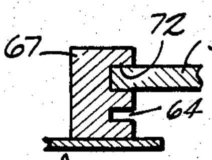
FIG. 9 is a section taken on a line corresponding to 9—9 in FIG. 7.
Figure 10:
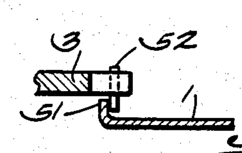
FIG. 10 is a section taken on a line corresponding with 10—10 in FIG. 7.

In FIG. 7, the center of the upper filter element 3 is presently coincident with the central X-ray path 56. Lug 51 on the unitary filter member is abutted against pins 52 and 53 as is shown in FIG. 7 and FIG. 9 as well. Filter element 1 is out of the X-ray beam path as is filter element 2 so the conditions for the filter elements in FIG. 7 correspond with those in FIG. 2. The collimator and filter device are variously oriented between vertical and horizontal attitudes on an actual X-ray machine. In the present filter design, the unitary filter element 4 is connected by means of the cable 74 to the motor so the motor will prevent the unitary member from shifting regardless of the attitude in which the filter assembly is disposed. The upper filter element 3, however, might slide in its tracks out of the position in which it should be fixed for a particular procedure. Accordingly, means are provided for assuring that the upper filter element 3 will remain in any position to which it has been forcibly translated. For this purpose, two latch members are provided. One latch member, 95, is mounted for pivoting on a pin 96 which is fixed in the top of track 66. The other latch member 97 is pivotable on a pin 98 which is similarly mounted to track 66. Upper filter element 3 has a fixed pin 99 extending from it. This pin is engageable in slots 100 and 101 of the latch members. The end 102 of a flat spring is presently pressing against a straight edge on latch member 97 in FIG. 7 so as to preclude the latch member from rotating and thereby securing filter element 3 in the position in which it is shown. Now if filter element 3 is driven to the left in FIG. 7, pin 99 in slot 100 will cause latch member 97 to rotate 90° clockwise and end up with straight edge 103 of this latch member being pressed by flat spring end 102 to maintain the slot 100 at the proper angle so that when pin 99 comes back, as it will be when filter element 3 is restored to its shown position, the pin can enter the slot 100 and rotate and reset latch 97. When filter element 3 in FIG. 7 is shifted to its leftmost position, of course, its upstanding pin 99 will engage in slot 101 of latch member 95 and cause it to rotate until the other end 104 of the flat spring will be pressing against the presently downwardly extending edge of the latch member 95 in FIG. 7. Thus, the upper filter element 3 is always automatically latched in the X-ray beam or in parked position depending on the operational mode of the filter device that is selected by the user and element 3 will now shift even though it is in other than a horizontal attitude.

Other detent means, not shown, could be used to retain filter element 3 at both limits of its travel. For example, spring biased balls, not shown, mounted in sockets on one of the tracks could be pressed into different dents or cavities in the surface of element 3. Alternatively, beveled chips of friction material such as rubber or vinyl, not shown, could be adhered to a surface of element 3 for sliding under tabs, not shown, mounted along the tracks for having the chips run under them to effect frictional gripping.

As implied earlier, the third filter element 3 may be eliminated in some applications in which case only the unitary filter element 4 having the two substantially coplanar and adjacent filter materials would be installed. This arrangement would reduce the inertia of the filter system even more than the already small inertia that exists in the three filter element combination which has been described and illustrated. Unitary filter element 4 has small area, is thin and has low weight and low interia so it can be shifted extremely fast with a low power drive system. Of course, element 4 has small area, is thin and also has low weight and inertia. Small area filters can be used because the filter assembly is so compact that it can be located very near to the focal spot of the X-ray tube where the X-ray beam is the narrowest. This permits achieving the objectives of being able to oscillate the filter elements at television frame rates with low power, low noise and no significant vibration.

In an actual embodiment, filter element 2, illustrated as gadolinium, is only about two inches square and 5 mils thick so it has trivial mass and inertia. Filter 1, illustrated as copper, is about the same size and about 20 mils thick. Filter 3, illustrated as aluminum, is a little more than 2 inches long overall and about 64 mils thick. The filter thicknesses given are appropriate for dual energy X-ray techniques wherein the kilovoltage applied to the X-ray tube anode is in the range of about 60 kilovolts to 135 kilovolts. Those skilled in the art will appreciate that various filter materials may be substituted for those which are given for illustrative purposes herein.

Figure 6:
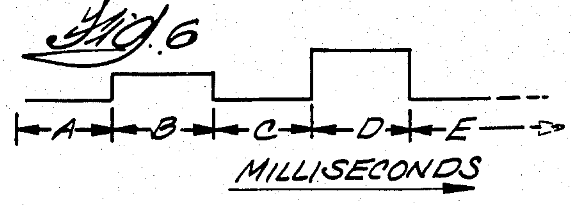
FIG. 6 is a timimg diagram that is useful for describing various operating modes of the new filter device.

FIG. 6 shows a timing diagram applicable to the new filter device. The diagram represents one cycle of a hybrid DSA exposure sequence. The first interval A is used for preparation and is typically about 33 ms or one TV camera frame time. Interval B is that during which a low energy exposure will be made, for example. This is typically anywhere between one frame or 33 ms to 500 ms or about 15 television frame times. Interval C is 33 ms or 1 TV frame time in an actual embodiment and within this interval filter positions must be exchanged. Concurrently with filter exchanging, the TV camera target is read out for the preceding low energy exposure. In an actual embodiment, 30 ms are allowed for making the filter change and the first three milliseconds of this interval are used by CPU 18 to make the necessary position signal computations. Interval D may be 33 ms or one TV frame time long or it may extend to 500 ms, typically, for making the high X-ray energy exposure in the closely consecutive pair. Then interval E may have a 33 ms or single TV frame time duration minimum to allow for changing filters and reading out the television camera target following the high energy exposure but interval E may be extended to obtain any desired amount of delay before going back to interval A for the next low energy exposure.

Although an illustrative embodiment of the new multiple mode translational-type filter device has been described in detail, such description is intended to be illustrative rather than limiting, for the invention may be variously embodied and is to be limited only by the claims which follow.

We claim:

1. A filter device for being interposed in an X-ray beam projected from an X-ray source, the device comprising:

a base member, a first generally planar filter element and a second generally planar filter element adjacent the first element and substantially coplanar therewith, said first and second elements being joined to form a unitary member mounted for travelling between limit positions relative to the base member in one plane that is transverse to the path of the central ray of the X-ray beam, a third planar filter element mounted for travelling relative to said base member in a second plane parallel to said one plane, means on said unitary member and third filter element cooperating to cause said member to pull said third filter element into the beam path when said member is driven toward and to one limit of its travel and to push said third element out of the beam when said member is driven toward and to the other limit of its travel, and reversible motor means and means operatively coupling said motor means to said member comprised of said first and second filter elements for said motor means to drive said member selectively in opposite directions to obtain a plurality of filtering modes, in one of said modes, driving the unitary member to said one limit position causing said third element to be pulled into the beam, in another of said modes, driving the unitary member to the other of said limit positions to push said third element out of the beam path to permit said member to be oscillated under the influence of said motor to position said first and second filter elements alternately in the beam path, and in another mode wherein said member is first moved to said one limit to pull said third filter element into the beam path and then said member is oscillated to position the first filter element in the beam path with the third element and alternately to let only the third filter element remain in the beam path.

2. The filter device according to claim 1 wherein said first filter element is copper, said second filter element is gadolinium and the third filter element is aluminum.

3. A filter device for use in an X-ray beam that is projected from an X-ray source, the device comprising:

first and second substantially planar filter elements composed of first and second X-ray filtering materials, said elements being substantially coplanar and adjacent each other and joined to form a unitary member, guide means for guiding said unitary member to travel between a limit position in one direction and a limit position in the opposite direction in a first plane that is transverse to the path of the central ray of the X-ray beam, a third substantially planar filter element and means for guiding said third element to travel in a second plane that is parallel to said first plane, reversible motor means and means operatively coupling said motor means to said unitary filter member for driving the member to one and the other of its opposite limit positions and to a position intermediate of said limit positions, first and second lug means spaced apart on said third filter element in the direction of its travel, and third lug means on said unitary filter member projecting between and in the path of travel of the first and second lug means on said third element, driving said unitary member to one of its limit positions causing said third lug means to engage said first lug means on said third filter element and move said third filter element into said X-ray beam path and driving said unitary member to the other of its limit positions causing said third lug means to engage said second lug means on said third element and move said third element out of the X-ray beam path.

4. The filter device according to claim 3 wherein said unitary member is comprised of a strip of one filter material a part of which constitutes said first filter element and said strip has an aperture adjacent said part in alignment with which said second filter element is fastened.

5. The filter device according to claim 4 wherein said strip comprises copper.

6. The filter device according to claim 4 wherein said strip comprises iron.

7. The filter device according to any of claims 3, 4, 5, or 6 wherein said third filter element comprises aluminum.

8. The filter device according to any of claims 3, 4, 5 or 6 wherein said second filter element comprises gadolinium.

9. The filter device according to claim 3 including engagement means spaced apart from each other along the path of travel of said third filter element, one of said engagement means engaging detachably with said third filter element when it is positioned in the X-ray beam path and the other of said engagement means engaging detachably with said third filter element when it is positioned out of the beam path to prevent said third element from shifting under the influence of gravity, the force applied to said third filter element by movement of said unitary filter member being sufficient to engage and detach said engagement means and third filter element.

10. The filter device according to claim 3 including latch elements spaced from each other along and above the path of travel of said third filter element and pivotable about axes, respectively, that are perpendicular to said second plane in which said third element travels, said latch elements each having a slot extending substantially radially away from the pivot axis of the element, pin means projecting from said third filter element into the plane of said latch elements for entering one slot or the other when said third element approaches one or the other of its length positions to rotate the latch element, and spring means acting one said latch elements, respectively, and whose force must be overcome by driving said filter element to rotate said latch elements and which spring means then applies said force for holding said latch element against rotation to lock the third filter element against moving under the influence of gravity.

* * * * *